US008891349B2

United States Patent
Teague et al.

(10) Patent No.: US 8,891,349 B2
(45) Date of Patent: Nov. 18, 2014

(54) METHOD OF OPTIMIZING PORTIONS OF A FRAME

(75) Inventors: Edward Harrison Teague, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1355 days.

(21) Appl. No.: 11/020,412

(22) Filed: Dec. 22, 2004

(65) Prior Publication Data

US 2006/0018258 A1     Jan. 26, 2006

Related U.S. Application Data

(60) Provisional application No. 60/590,538, filed on Jul. 23, 2004.

(51) Int. Cl.
| | | |
|---|---|---|
| *H04J 9/00* | (2006.01) | |
| *H04L 1/00* | (2006.01) | |
| *H04L 1/18* | (2006.01) | |

(52) U.S. Cl.
CPC ............ *H04L 1/0003* (2013.01); *H04L 1/1812* (2013.01); *H04L 1/0033* (2013.01); *H04L 1/0026* (2013.01); *H04L 1/0025* (2013.01)
USPC ............ 370/204; 370/208; 370/509; 370/513

(58) Field of Classification Search
USPC ......... 370/323, 324, 329, 332, 337, 341, 349, 370/350, 320, 229, 204, 206, 208, 301, 304, 370/305, 437, 509, 513; 455/434, 435.5
See application file for complete search history.

(56) References Cited

U.S. PATENT DOCUMENTS

| | | | |
|---|---|---|---|
| 4,991,184 A | 2/1991 | Hashimoto | 375/8 |
| 6,434,201 B1 | 8/2002 | Ohno | 375/285 |
| 2002/0032030 A1* | 3/2002 | Berglund et al. | 455/434 |
| 2003/0031149 A1* | 2/2003 | Odenwalder et al. | 370/337 |
| 2003/0072255 A1 | 4/2003 | Ma et al. | 370/208 |
| 2003/0157900 A1* | 8/2003 | Gaal et al. | 455/69 |
| 2004/0081115 A1* | 4/2004 | Parsa et al. | 370/320 |
| 2004/0120342 A1* | 6/2004 | Ekl et al. | 370/447 |
| 2004/0120411 A1 | 6/2004 | Walton et al. | 375/260 |
| 2004/0228353 A1* | 11/2004 | Balachandran et al. | 370/395.21 |
| 2005/0068928 A1* | 3/2005 | Smith et al. | 370/338 |
| 2005/0239463 A1* | 10/2005 | Lagnado | 455/435.2 |
| 2005/0281219 A1* | 12/2005 | Kim et al. | 370/328 |
| 2011/0044273 A1* | 2/2011 | Maltsev et al. | 370/329 |

FOREIGN PATENT DOCUMENTS

| | | |
|---|---|---|
| EP | 1 255 368 A1 | 4/2001 |
| WO | WO 03/001702 A1 | 1/2003 |

OTHER PUBLICATIONS

International Search Report and Written Opinion—PCT/US2005/023978, International Search Authority—European Patent Office, Dec. 9, 2005.

* cited by examiner

*Primary Examiner* — Awet Haile
(74) *Attorney, Agent, or Firm* — Stanton Braden

(57) ABSTRACT

A method of optimizing performance in a wireless communication system by transmitting a first parameter using a first channel before the optimization of one or more selected channels, wherein the first parameter comprises a modulation scheme used to optimize performance of one or more channels and a first schedule.

12 Claims, 4 Drawing Sheets

METHOD OF OPTIMIZING PORTIONS OF A FRAME

REFERENCE TO CO-PENDING APPLICATIONS FOR PATENT

This application is related to the following co-pending U.S. application Ser. No. 10/340,507, filed on Jan. 10, 2003, assigned to the assignee hereof and expressly incorporated herein by reference. The present Application for patent claims a priority to Provisional Application No. 60/590,538 filed Jul. 23, 2004 assigned to the assignee hereof and expressly incorporated herein by reference.

FIELD OF INVENTION

The present invention relates generally to communication and more specifically to techniques for optimizing portions of frame.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station communicates with base station using a reverse link.

A wireless communication system may employ multi-carrier modulation for data transmission. Common examples of multi-carrier modulation include orthogonal frequency division multiplexing (OFDM) and discrete multi-tone (DMT). OFDM effectively partitions the overall system bandwidth into a number of orthogonal subbands. Each subband is associated with a respective carrier upon which data may be modulated. The carriers for the subbands may be independently modulated with data, and the modulated carriers are then added together to generate an output waveform.

OFDM transmissions have several fundamental parameters that must be known or must be detectable by user devices (terminals) to enable demodulation of the OFDM signals. Some of the parameters should be tuned to match the specific deployment characteristics of a network to enhance performance. While it may be possible to perform "blind detection" of the settings by terminals in the network, this is difficult or expensive (in terms of computation, power, delay, etc.) process for the terminal.

Thus, there is a need for a system and method to provide fundamental parameters of the OFDM modulation to terminals outside the OFDM modulation to enable such network flexibility, and to enable terminals to quickly and easily gain access to the OFDM modulated data transmissions.

BRIEF SUMMARY

Accordingly, a method of optimizing performance in a wireless communication system are provided, the method transmitting a first parameter using a first channel before the optimization of one or more selected channels, wherein said first parameter comprises a modulation scheme used to optimize performance of one or more channels and a first schedule.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a terminal is receiving and processing data received on a given channel.

Figure 1:
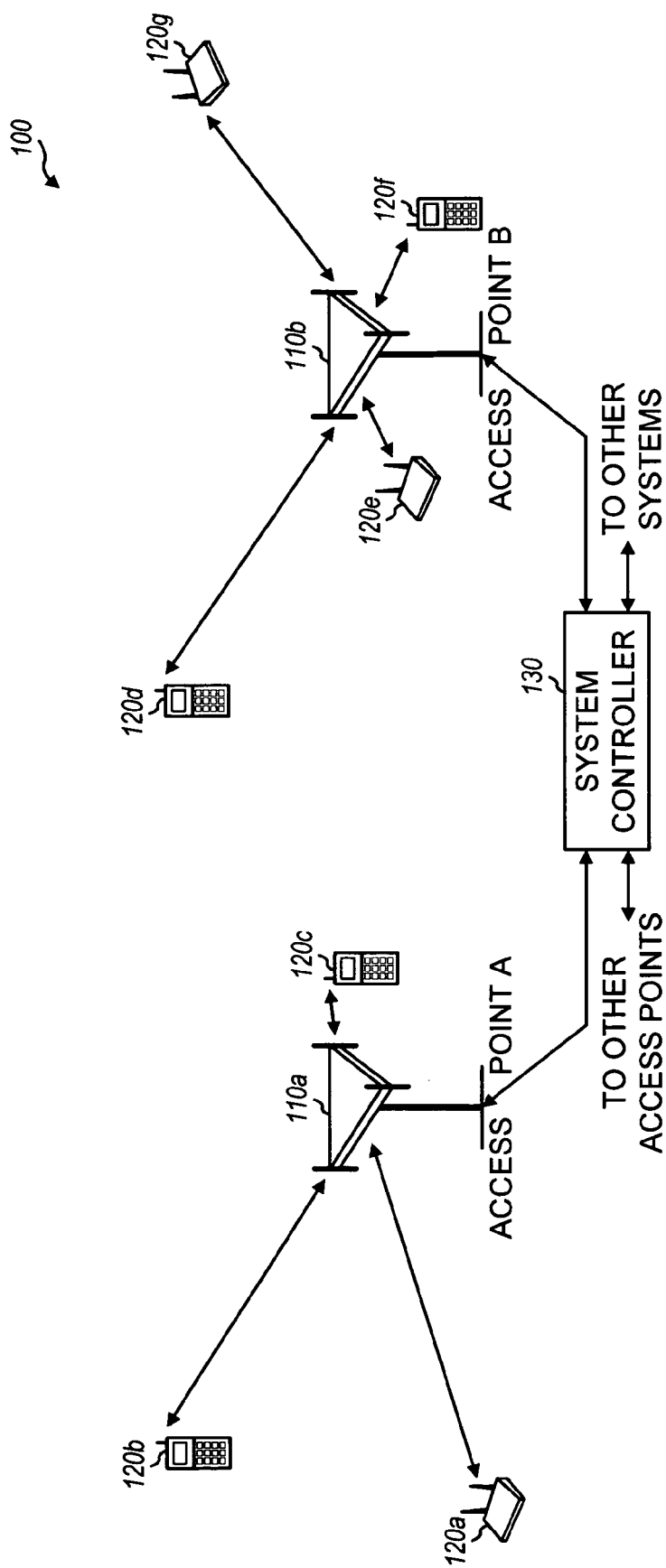
FIG. 1 shows a diagram of a wireless multiple-access communication system.

FIG. 1 shows a diagram of a wireless multiple-access communication system 100 that employs multi-carrier modulation. System 100 includes a number of access points, for example 110a and 110b that communicate with a number of access terminal 120a-120g. For simplicity, only two access points 110a and 110b and only seven access terminals 120a-120g are shown in FIG. 1. For purpose of discussion, when referring to a single access terminal (AT) 120x is used and when referring to a single access point (AP) 110x will be used (AT 120x and AP 110x are described in FIG. 2, infra)

An access point 110x, is an electronic device configured to communicate with one or more access terminals and may also be referred to as a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc.

An access terminal 120x, is an electronic device configured to communicate with the access point via a communication link. The access terminal 120x may also be referred to as a terminal, a user terminal, a remote station, a mobile station, a wireless communication device, recipient terminal, or some other terminology. The access terminal, mobile terminal, user terminal, terminal are interchangeably used in the description below. Each access terminal 120x may communicate with one or multiple access points on the downlink and/or uplink at any given moment. The downlink (i.e., forward link) refers to transmission from the access point to the access terminal

120x, and the uplink (i.e., reverse link) refers to transmission from the access terminal 120x to the access point. The access terminal 120x may be any standard laptop, personal electronic organizer or assistant, a mobile phone, cellular phone, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the access terminals, and between the access terminals and other users coupled to the other systems/networks.

The techniques described herein for optimizing portions of a frame may be implemented in various wireless multiple-access multi-carrier communication systems. For example, system 100 may be an OFDMA, CDMA, GSM, WCDMA, etc. system that utilizes data transmission.

For clarity, these techniques are described for an OFDMA system that utilizes orthogonal frequency division multiplexing (OFDM). OFDM effectively partitions the overall system bandwidth into a number of (N) orthogonal frequency sub-bands, which are also referred to as tones, sub-carriers, bins, frequency channels, and so on. Each subband is associated with a respective sub-carrier that may be modulated with data. In the OFDMA system, multiple orthogonal "traffic" channels may be defined whereby (1) each subband is used for only one traffic channel in any given time interval and (2) each traffic channel may be assigned zero, one, or multiple sub-bands in each time interval. A traffic channel may be viewed as a convenient way of expressing an assignment of subbands for different time intervals. Each access terminal 120x may be assigned a different traffic channel. For each sector, multiple data transmissions may be sent simultaneously on multiple traffic channels without interfering with one another.

Figure 2:
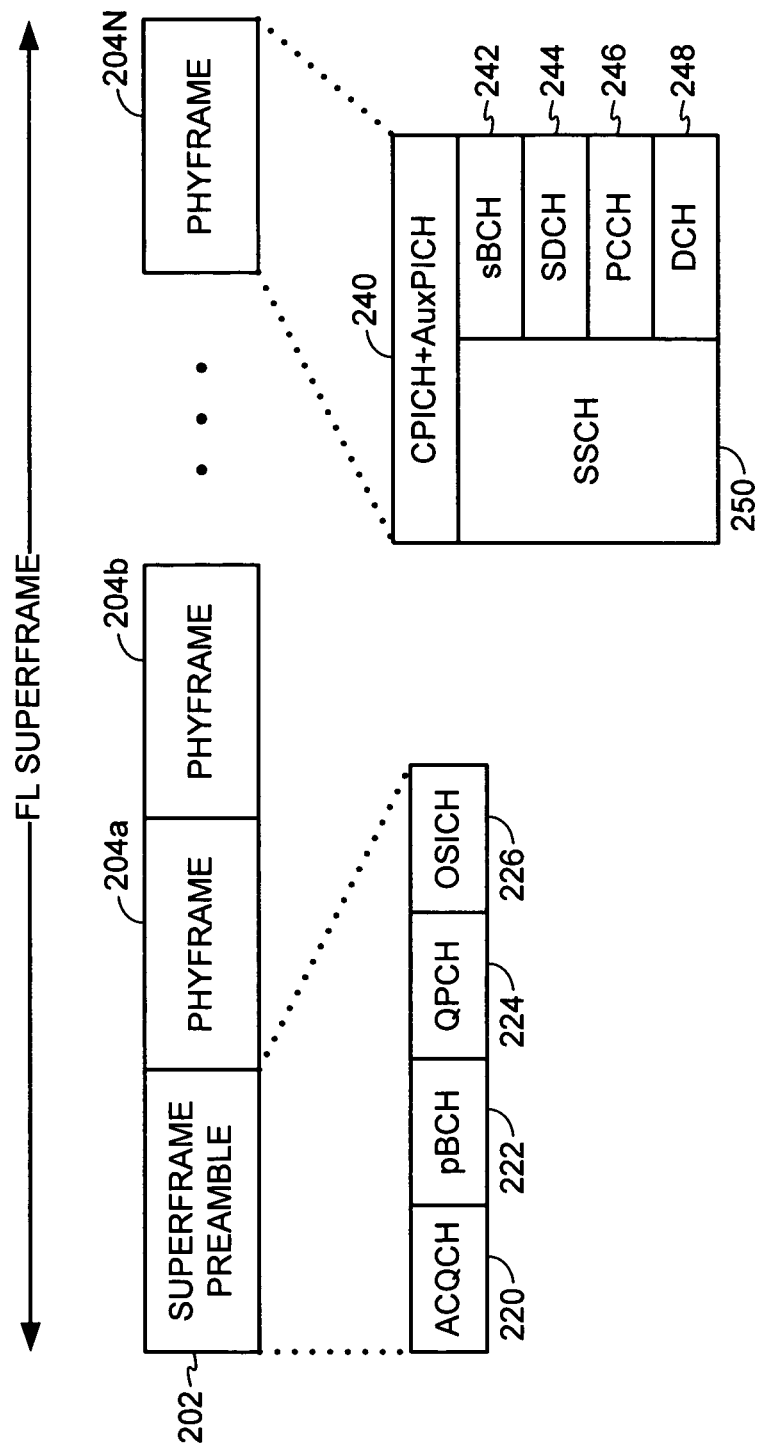
FIG. 2 illustrates a frame structure for a forward link superframe.

FIG. 2 illustrates a frame structure 200 for a forward link super-frame of OFDMA system. In an embodiment, the forward link superframe comprises a superframe preamble portion followed by 6 PHYFrames portion. The superframe preamble portion comprises a plurality of channels, an Acquisition Channel (ACQCH) 220, a Primary Broadcast Channel (PBCH) 222 (also referred to an SYNC channel), a Quick Paging Channel (QPCH) 224, and a Other Sector Interference Channel (OSICH) 226. Each PHYFrame portion comprises a plurality of physical channels, a pilot one or more pilot channel 240 (for example a Common Pilot Channel (CPICH) and, if present, an Auxiliary Pilot Channel (AuxPICH)), a Shared Signaling Channel (SSCH) 250, a Data Channel (DCH) 248, a Secondary Broadcast Channel (sBCH) 242, a Shared Data Channel (SDCH) 244 and a Power Control Channel (PCCH) 246.

The modulation used on the forward link is Orthogonal Frequency Division Multiplexing (OFDM). Both the superframe preamble as well as each PHY Frame shall be further subdivided into units of OFDM symbols. An OFDM symbol is comprised of $N_{FFT}$ individually modulated subcarriers which carry complex-valued data.

Since orthogonal frequency division multiplexing (OFDM) is a multi-carrier transmission technique, the available spectrum is divided into many sub-carriers, each being modulated by data at a relatively low data rate. OFDM supports multiple access by allocating different sub-carriers to different users. The sub-carriers for OFDM are orthogonal and closely spaced to provide an efficient spectrum. In an embodiment, each narrow band sub-carrier may be modulated using various modulation schemes, such as quadrature phase-shift keying (QPSK) and quadrature amplitude modulation (QAM). OFDM modulation is provided using an Inverse Fast Fourier Transform (IFFT). Initially, data for transmission is mapped into quadrature-based symbols that are encoded onto the individual sub-carriers. An IFFT is performed on the set of modulated sub-carriers to produce an OFDM symbol in the time domain. Typically, a cyclic prefix is created and appended to the beginning of the OFDM symbol before it is amplified and transmitted. During reception, the OFDM symbols are processed using a fast Fourier transform (FFT) to recover the modulated sub-carriers, from which the transmitted symbols can be recovered and decoded to arrive at the transmitted data.

In an OFDM transmission can be optimized if the conditions of a particular deployment are known. For example, the number of subcarriers in the OFDM transmission (FFT size), the configuration of the guard subcarriers—the subcarriers that have been selected to be blanked to zero transmit power, the number of symbols in the cyclic prefix, the FDM pilot configuration, or the Broadcast channel configuration. Depending on the modulation scheme used, one or more parameters would be required by the recipients (the access terminals) in order to demodulate the OFDM transmissions. In an embodiment, SYNC channel is used to inform access terminals. The number of parameters carried in the SYNC channel and their exact mapping to various configurations may be specified and already known to access terminals.

As an example, the cyclic prefix length is known to affect the impact of channel delay spread on OFDMA transmissions. If it is discovered that delay spread is a problem in a certain deployment, the cyclic prefix length may be increased. The SYNC channel would be used to inform access terminals of the cyclic prefix length that is being used. If a change to the OFDM transmission parameters were desirable, the SYNC channel would be used to preannounce this change to the access terminals and provide a particular action time relative to the system time. For example, changes might only be valid every ½ hour. A change broadcast in the SYNC channel would take effect at the beginning of the following ½ hour boundary. This allows the access terminal 120x effected to prepare and make a change to their demodulation engine prior to the change.

Figure 3:
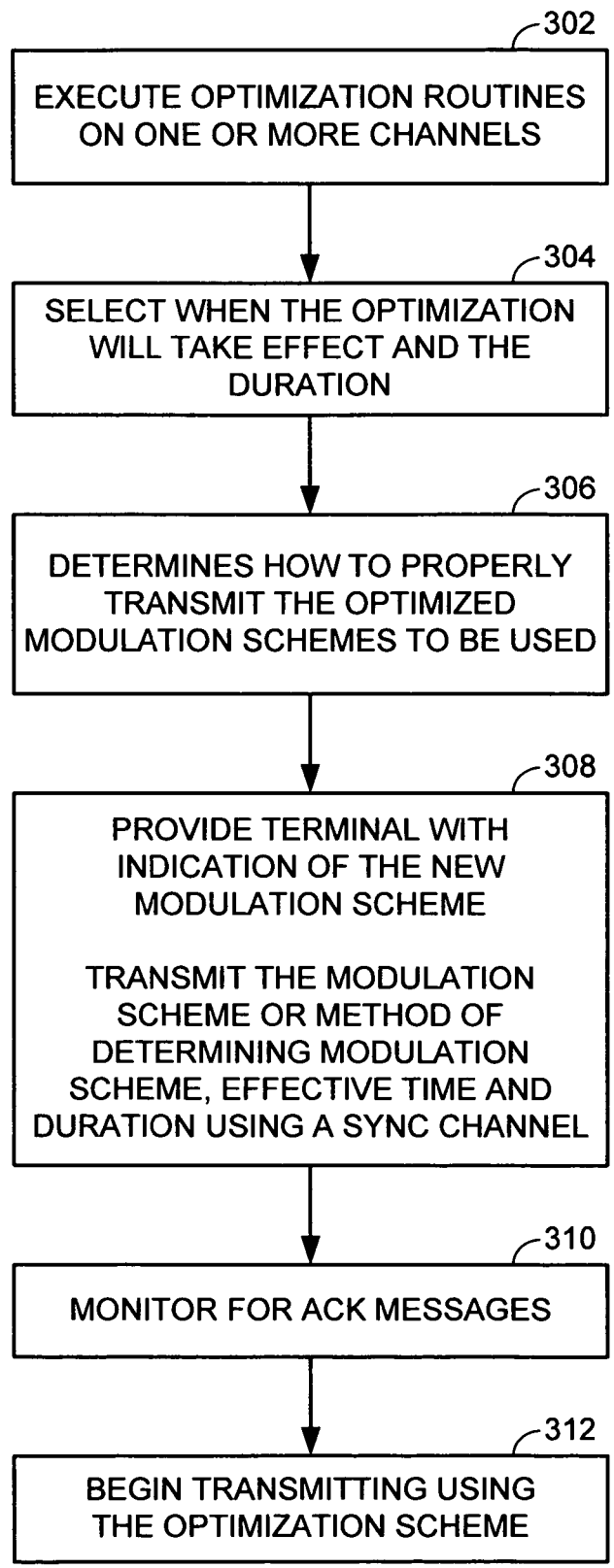
FIG. 3 illustrates a process for providing modulation parameters to the users using one or more broadcast channels.

FIG. 3 illustrates a process 300 for providing modulation parameters to the users using one or more broadcast channels. The system controller 130 may be configured to execute the steps of process 300. The AP 110x is configured to execute steps of the process 300 by utilizing at least one of various components described in FIG. 4 infra, for example, the controller 420, the scheduler 430, the memory 422, the TX data processor 414, RX data processor 434, etc. At step 302, the access point 110x determines the execution of new modulation schemes in order to optimize the communication. For example, the access point 110x may optimize bit rate for one or more the PHY channels without modifying the preamble portions of the superframe.

At step 304, based on various factors such as channel condition and bit error rate, the access point 110x further determines when the new modulation scheme will take effect and for how long. At step 306, the access point 110x determines how to properly transmit the optimized modulation schemes to be used. Depending on which channel is optimized and which modulation scheme used, the modulation parameters are packaged and transmitted using a portion of the broadcast channel. At step 308, the access point 110x using the TX Data processor 414 transmits to the access terminal 120x, the modulation parameters and a modulation schedule. The modulation schedule comprising a first time value which indicates the time when the new modulation scheme will take effect and a second time value which indicates the duration of the new modulation scheme. Generally, the access point 110x uses the broadcast channel portion of the super-frame preamble to provide the modulation parameters and the modulation schedule. The transmitted parameters may be indexes; the indexes may be used by the recipient to lookup information about the demodulation scheme. In an embodiment, the access point 110x may use an ACK/NACK and Hybrid Automatic Retransmission/Repeat Request (HARQ) schemes to insure that the recipient received the new modulation parameters before switching to the new modulation scheme. At step 310, the access point 110x monitors for ACK/NACK messages that indicate that the access terminal 110x received the new parameters. If no ACK is received the access point 110x before a predetermined time lapses or an NACK is received, the access point 110x may retransmit the new modulation parameter. Otherwise, at step 312, the access point 110x begins using the new modulation scheme at the appropriate set schedule.

In an embodiment, the process 300 may be implemented and executed by at least one component of the access terminal 120x (FIG. 4) for optimizing reverse link resources.

In an embodiment, an access terminal 120x or access point 10x may receive the optimization as receiving entity. Thus, the receiving entity provides a acknowledgement (ACK) to the transmitting entity, indicating the reception of the new optimization scheme. Upon extracting and demodulating the received parameters indicating the optimization scheme to use, the time scheme will take effect and duration of using the received optimization scheme.

Figure 4:
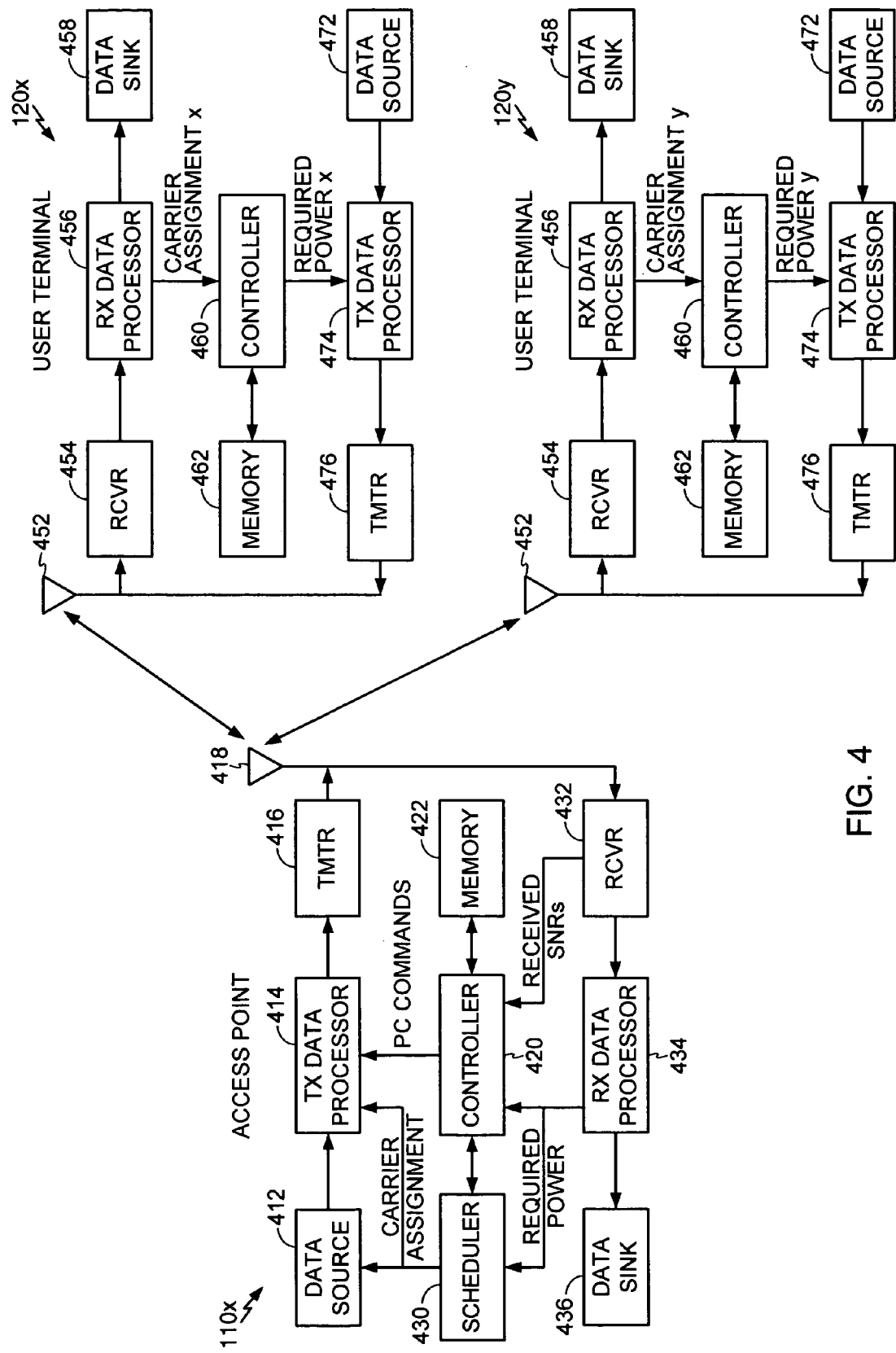
FIG. 4 a block diagram of a communication system.

FIG. 4 shows a block diagram of an embodiment of an access point 110x and two terminals 120x and 120y in multiple-access multi-carrier communication system 100. At access point 110x, a transmit (TX) data processor 414 receives traffic data (i.e., information bits) from a data source 412 and signaling and other information from a controller 420 and a scheduler 430. For example, controller 420 may provide power control (PC) commands that are used to adjust the transmit power of the active terminals, and scheduler 430 may provide assignments of carriers for the access terminals. These various types of data may be sent on different transport channels. TX data processor 414 encodes and modulates the received data using multi-carrier modulation (e.g., OFDMA) to provide modulated data. A transmitter unit (TMTR) 416 then processes the modulated data to generate a downlink modulated signal that is then transmitted from an antenna 418.

At each of terminals 120x and 120y, the transmitted and modulated signal is received by an antenna 452 and provided to a receiver unit (RCVR) 454. Receiver unit 454 processes and digitizes the received signal to provide samples. A received (RX) data processor 456 then demodulates and decodes the samples to provide decoded data, which may include recovered traffic data, messages, signaling, and so on. The traffic data may be provided to a data sink 458, and the carrier assignment and PC commands sent for the access terminal 120x are provided to a controller 460.

Controller 460 directs data transmission on the uplink using the specific carriers that have been assigned to the access terminal 120x and indicated in the received carrier assignment. Controller 460 further adjusts the transmit power used for the uplink transmissions based on the received PC commands.

For each active terminal 120x, a TX data processor 474 receives traffic data from a data source 472 and signaling and other information from controller 460. For example, controller 460 may provide information indicative of the required transmit power, the maximum transmit power, or the difference between the maximum and required transmit powers for the access terminal 120x. The various types of data are coded and modulated by TX data processor 474 using the assigned carriers and further processed by a transmitter unit 476 to generate an uplink modulated signal that is then transmitted from antenna 452.

At access point 110x, the transmitted and modulated signals from the access terminals are received by antenna 418, processed by a receiver unit 432, and demodulated and decoded by an RX data processor 434. Receiver unit 432 may estimate the received signal quality (e.g., the received signal-to-noise ratio (SNR)) for each access terminal 120x and provide this information to controller 420. Controller 420 may then derive the PC commands for each access terminal 120x such that the received signal quality for the access terminal 120x is maintained within an acceptable range. RX data processor 434 provides the recovered feedback information (e.g., the required transmit power) for each access terminal 120x to controller 420 and scheduler 430.

Scheduler 430 uses the feedback information to perform a number of functions such as (1) selecting a set of access terminals for data transmission on the reverse link and (2) assigning carriers to the selected access terminals. The carrier assignments for the scheduled access terminals are then transmitted on the forward link to these access terminals.

The techniques described herein may be implemented by various means. For example, these techniques may be implemented in hardware, software, or a combination thereof. For a hardware implementation, the processing units (e.g., controllers 420 and 470, TX and RX processors 414 and 434, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 422 in FIG. 4) and executed by processors (e.g., controllers 420). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of optimizing portions of a frame in a wireless multi-carrier modulation communication system by providing parameters of said system to terminals outside of said system, comprising:
   selecting one or more channels from a plurality of physical channels for optimizing performance;
   selecting a first schedule;
   transmitting a first parameter using a first channel before the optimization of said one or more selected channels, wherein said first parameter comprises a new modulation scheme to optimize performance of said one or more selected channels and said first schedule;
   transmitting a second parameter comprising an indication of change of cyclic prefix length,
   wherein said first schedule comprising a first time value which indicates the time when the new modulation scheme will take effect and a second time value which indicates the duration of the new modulation scheme.

2. The method as claimed in claim 1, further comprising an act of determining said modulation scheme to use for optimizing performance.

3. A method of optimizing portions of a frame in a wireless multi-carrier modulation communication system, the method comprising:
   receiving a first parameter via a first channel before the optimization of one or more selected channels;
   wherein said first parameter comprises a new modulation scheme to optimize performance of said one or more selected channels and first schedule;
   receiving a second parameter including an indication of change of cyclic prefix length;
   wherein said first schedule comprising a first time value which indicates the time when the new modulation scheme will take effect and a second time value which indicates the duration of the new modulation scheme; and
   transmitting an indication of received said first parameter and providing an indication of received said second parameter.

4. An apparatus for optimizing performance in a wireless multi-carrier modulation communication system by providing fundamental parameters of said system to terminals outside of said system, the apparatus comprising:
   means for selecting one or more channels from a plurality of physical channels for optimizing performance;
   means for optimizing portions of a frame by transmitting a first parameter using a first channel before the optimization of said one or more selected channels, wherein said first parameter comprises a modulation scheme to optimize performance of said one or more channels and a first schedule;
   means for transmitting a second parameter comprising an indication of change of cyclic prefix length;
   wherein said first schedule comprising a first time value which indicates the time when the new modulation scheme will take effect and a second time value which indicates the duration of the new modulation scheme.

5. The apparatus as claimed in claim 4, further comprising means for determining said modulation scheme to use for optimizing performance.

6. An apparatus for optimizing performance in a wireless multi-carrier modulation communication system, the apparatus comprising:
   means for receiving a first parameter via a first channel before the optimization of one or more selected channels;
   means for receiving a second parameter including an indication of change in cyclic prefix length;
   wherein said first parameter comprises a new modulation scheme to optimize performance of said one or more selected channels and said first schedule;
   wherein said first schedule comprising a first time value which indicates the time when the new modulation scheme will take effect and a second time value which indicates the duration of the new modulation scheme; and
   means for providing an indication of received said first parameter.

7. In a wireless multi-carrier modulation communication system, an apparatus comprising:
   an electronic device, comprising a processor and memory coupled to the processor;
   said electronic device configured to:
   select one or more channels from a plurality of physical channels for optimizing performance;
   selecting a first schedule;
   transmit a first parameter using a first channel before the optimization of said one or more selected channels, wherein said first parameter comprises a new modulation scheme and said first schedule, wherein said modulation scheme is used to optimize performance of said one or more channels;
   wherein said first schedule comprising a first time value which indicates the time when the new modulation scheme will take effect and a second time value which indicates the duration of the new modulation scheme
   said electronic device being further configured to transmit a second parameter, said second parameter providing an indication of change in cyclic prefix length.

8. The apparatus as claimed in claim 7, further configured to select one or more channels from a plurality of physical channels for optimizing performance.

9. The apparatus as claimed in claim 7, further configured to determine said modulation scheme to use for optimizing performance.

10. In a wireless multi-carrier modulation communication system, an apparatus comprising:
    an electronic device, comprising a processor and memory coupled to the processor;
    said electronic device configured to:
    receive a first parameter via a first channel before optimization of one or more selected channels;
    wherein said first parameter comprises a new modulation scheme to optimize performance of said one or more selected channels and said first schedule;
    wherein said first schedule comprising a first time value which indicates the time when the new modulation scheme will take effect and a second time value which indicates the duration of the new modulation scheme; and
    said electronic device being further configured to receive a second parameter, said second parameter including an indication of change of cyclic prefix length.

11. A non-transitory machine-readable medium comprising instructions which, when executed by a machine, cause the machine to perform operations of optimizing performance in a wireless multi-carrier modulation communication system by:
    receiving a first parameter via a first channel before the optimization of one or more selected channels;

wherein said first parameter comprises a new modulation scheme to optimize performance of said one or more selected channels and first schedule;

receiving a second parameter, said second parameter being indicative of a change in cyclic prefix length;

wherein said first schedule comprising a first time value which indicates the time when the new modulation scheme will take effect and a second time value which indicates the duration of the new modulation scheme; and transmitting an indication of received said first parameter and providing an indication of received said second parameter.

12. A non-transitory machine-readable medium comprising instructions which, when executed by a machine, cause the machine to perform operations of optimizing performance in a wireless multi-carrier modulation communication system comprising:

selecting one or more channels from a plurality of physical channels for optimizing performance;

selecting a first schedule;

transmitting a first parameter using a first channel before the optimization of said one or more selected channels, wherein said first parameter comprises a new modulation scheme to optimize performance of said one or more selected channels and said first schedule:

transmitting a second parameter comprising an indication of change of cyclic prefix length, wherein said first schedule comprising a first time value which indicates the time when the new modulation scheme will take effect and a second time value which indicates the duration of the new modulation scheme.

* * * * *